United States Patent Office 3,282,869
Patented Nov. 1, 1966

3,282,869
PHENOLIC RESIN ADHESIVE WITH HEAT-TREATED PENTOSAN RESIDUE EXTENDER
Fred Bryner, Midland, Mich., assignor to The Dow Chemical Company, Midland, Mich., a corporation of Delaware
No Drawing. Filed Dec. 17, 1962, Ser. No. 244,926
14 Claims. (Cl. 260—17.2)

The present invention relates to novel adhesive compositions and articles manufactured therewith. More particularly, the invention concerns providing an improved extender for liquid phenolic resin adhesive formulations.

The use of partially condensed phenol-aldehyde resins in thermosetting, adhesive formulations is a highly developed art. Most of such formulations, when ready for use, comprise, in addition to the resin, a liquid dispersing medium, a catalyst to promote resin cure, an extender or filler and sometimes special additives to modify such characteristics of the glue as its flowability, rate of cure, spreadability or viscosity.

Of primary interest herein are the extending components of phenolic resin adhesive formulations among which a commonly used extender is the solid residue by-product from the acid hydrolysis of pentosan-containing materials as taught by Ash et al. in U.S. Patent 2,727,869. Extenders such as these are employed to reduce the relative proportion of resin solids required in a given adhesive formulation. The residue materials taught by Ash et al. are indicated to be useful in amounts up to as much as one part by weight per part by weight of resin solids. At such high levels of extension, however, the resulting adhesive formulations are unsatisfactory for the manufacture of exterior grade plywoods according to Douglas Fir Plywood Association standards. See "Douglas Fir Plywood Commercial Standard CS45–55." To prepare glues suitable for the manufacture of exterior grade plywoods, Ash et al. teach that it is necessary to digest the residue extenders with alkali and to limit the amount of such extender used to about 25 parts, or less, for each 40 parts of resin solids, i.e., a maximum of about 68 percent extension.

A principal object of the invention is to provide an improved, highly extended, liquid adhesive composition based on soluble, thermosetting phenolic resins. A particular object is to provide phenolic resin adhesive formulations, suitable for the manufacture of exterior grade plywood containing up to 200 percent, or more, based on the resin solids of a novel extender. A particular object is to provide an improved phenolic resin extender obtained by specially heat treating the solid residue by-product from the acid hydrolysis of pentosan-containing materials. These and other objects are accomplished in the invention hereinafter set forth.

In accordance with the present invention, an improved, highly extended, phenolic resin adhesive formulation is provided by uniformly mixing a soluble phenolic resin with a material proportion, e.g., from about 0.25 up to 2.5 parts, preferably from about 1 to 1.6 parts, by weight per part of resin solids of a specially conditioned form of the finely divided residue from the acid hydrolysis of pentosan-containing materials. The special conditioning required comprises subjecting the residue to a certain heat treatment schedule and thereafter digesting the heat treated residue with a controlled amount of an alkali metal hydroxide. The heat treatment consists of heating the described residue in granular form at a temperature within the range from about 80° to about 200° C. until a weight loss of at least 3 percent but no more than 20 percent of its original weight is achieved. Although it is possible to conduct the heat treatment under a vacuum or oxygen-free atmosphere, it is a particular advantage of the invention that the residue can be heated while exposed to air. Alkali digestion of the heat treated residue may be carried out prior to incorporating a residue in the glue, but a more common practice is to add the heat treated residue and alkali metal hydroxide to the glue as separate components, whereby digestion of the heat treated residue is accomplished in situ. A suitable amount of an alkali metal hydroxide, preferably caustic, for this purpose may vary from as little as 1.5 up to as much as 15 percent by weight of the residue.

As employed above, the terminology "original weight" is to be understood as having reference to the weight of a solid residue which is at least sufficiently dry to be granulated. Depending upon the fineness to which it is ground and the particular atmospheric humidity conditions under which it is stored, a particular granular form of the residue may contain anywhere from as little as 3 percent to as much as 35 percent absorbed moisture.

In addition to the foregoing ingredients, a complete glue also includes a basic catalyst for the thermosetting reaction of the phenolic resin and an effective amount of an aqueous dispersing medium. Enough of the aqueous medium is employed to provide a spreadable liquid formulation having a solids content within the range from about 35 to about 65 percent by weight of the total composition.

The solid residues described above are by-products from the acid hydrolysis of pentosan-containing materials whereby furfural is produced. Suitable pentosan-containing materials include oat hulls, corn cobs and the like pentosan-containing materials of the order Graminales. In conventional practice, such materials are hydrolyzed with a mineral acid and thereafter subjected to steam distillation, solvent extraction or one or more other separatory operations to recover furfural released by the acid treatment. The remaining solid residues from these extaction processes are commercially available. One such commercial product is marketed under the trademark "Furafil" (Quaker Oats Company). As marketed, the particle size and natural moisture content of these materials may vary considerably. However, these physical parameters of the granulated residues are of little consequence in the present invention insofar as the heating operation is concerned. While improved results are achieved by heating any such residue, regardless of its moisture content to a weight loss within the above-described range, best results are achieved by heating to weight losses which are more or less directly proportional to the moisture content of the granulated residue starting material. For this pupose, moisture content is determined by heating the residue at 50° C. under a reduced pressure of 25 millimeters of mercury for 3 hours and observing the resulting weight loss. Thus, for residues containing generally lower amounts of absorbed moisture, the weight loss for the best improvement in glue extension can be less than is required to achieve comparable results using residues with larger amounts of initial absorbed moisture.

It is important in the heat treating operation that heating means be utilized whereby the specified elevated temperatures are achieved uniformly throughout the granulated residue. To this end, it is desirable to utilize a rotating, horizontal kiln or a similar device whereby granular solids are uniformly heated. Upon completing a proper heat treatment, the treated residues are suitably ground or pulverized as necessay to provide a finely divided extender of the invention. The terminology "finely divided" as used herein means that the residues have a particle size small enough to pass through an 80 mesh screen, preferably a 160 mesh screen of the Tyler mesh series.

In addition to the aforedescribed essential ingredients, other materials may be added to the glue formulation of the invention for special purposes. Such additional materials include other extenders, e.g., amylaceous materials and blood, fillers, hardening agents, antifoam agents, viscosity modifiers and the like. Particularly good results are achieved with the conjunctive employment of the amylaceous materials, i.e., containing starches, such as flours of wheat, corn, oats, rye or the like grains. To properly condition them for utilization in the glue formulations of the invention, these amylaceous materials are swelled by boiling in water or by digesting with an alkali metal hydroxide. The latter operation is usually carried in situ within the glue formulation by adding the extender and hydroxide to the formulation as separate ingredients. The amount of alkali metal hydroxide required for this purpose will be within the limits of from about 5 to about 35 percent by weight of the material to be digested or swelled.

Phenolic resins suitable for employment in the invention are thermosetting, base catalyzed, partial condensation products (soluble in aqueous solvents) of one or more hydroxy aromatic compounds (phenols) and one or more suitable aldehydic materials. Aldehydic, as employed herein, refers to aldehydes and similarly acting materials. From about 1.8 to about 3, preferably from 2.0 to 2.3 chemical equivalents of the aldehydic material, are reacted with each mole of the phenol used. Particular condensation products are obtained by partially reacting, in appropriate proportions to provide a thermosetting product, a phenol, such as phenol, cresol, resorcinol, 3,5-xylenol with a suitable aldehydic materials. Specific examples of suitable aldehydes, or similarly acting materials, are aqueous formaldehyde, para-formaldehyde, trioxymethylene and the like methylene-providing materials. Also operable are acetaldehyde, furfuraldehyde and the like aldehydic materials which react with the mentioned phenols to form soluble, intermediate, polycondensation products.

It will be observed that the phenols specified are those having at least 3 reactive ring positions, i.e., at least 3 nuclear carbon atoms having substituent hydrogen atoms in ring positions ortho and para to a hydroxy group. If desired, other phenols having less than 3 active positions can be used in admixture with one or more of the above-mentioned phenols, but it is essential in order to provide a thermosetting composition that at least a predominant portion of the phenolic reactant employed is of the class having 3 active ring positions.

The above thermosetting phenolic resins are normally prepared in the presence of an aqueous solvent with the aid of a basic catalyst. The usual procedure is to mix desired proportions of the resin forming reactants into a sufficient amount of an aqueous solvent to provide a liquid reaction system having from about 30 to about 60, preferably 38 to 50, percent by weight solids. A basic catalyst is added to the reaction mixture and the resulting system is heated at an elevated temperature to provide a partially condensed, fusible resin, which is at least water-dispersible in the presence of alkali, if not completely soluble therein. Exemplary aqueous solvents that can be employed as the reaction medium include, in addition to water, mixtures of water with the lower water-soluble alkanols, ketones and the like organic solvents miscible with water.

Another fundamental component of the adhesive formulation is a small but catalytically effective amount of a catalyst for thermosetting or curing the phenolic resin. The catalyst is basic in nature and may be inorganic or organic. Examples of suitable basic catalysts are the alkali metal hydroxides (an excess of the alkali metal hydroxide used to causticize an extender is satisfactory), alkali metal carbonates, alkali metal silicates, alkali metal borates, alkali metal phosphates, ammonium hydroxide or such water-soluble basic organic compounds as the amines including primary, secondary and tertiary alkylamines or arylamines. Examples of the latter materials are methylamine, dimethylamine, trimethylamine, ethylenimine, pyridine, aniline and the like. A preferred catalyst system utilizes an alkali metal carbonate in an amount within the range of 0.5 to 20 percent by weight of the resin solids.

The solid adhesive formulation components of the invention are dispersed or dissolved, as the case may be, in a sufficient amount of an aqueous solvent medium, which may be water or mixtures thereof with a water-soluble alcohol, to provide a readily flowable or mechanically spreadable composition. For best results, the total solids of the extended glue compositions of the invention are within the range from about 35 to about 65 percent by weight of the total composition. Preferably, the solids content of the glue composition is within the range from about 37 to 50 percent by weight of the total composition.

In preparing a glue formulation of the invention, phenolic resin, catalyst, aqueous dispersing medium and the above-described heat treated residue from the acid hydrolysis of pentosan-containing materials along with a suitable amount of an alkali metal hydroxide to properly digest the heat treated residue are mixed together in any order. Usually, with the addition of each component, the resulting mixture is stirred or otherwise mixed, preferably at room temperature, until a uniform blend at a desired consistency is obtained. The blend consistency can be controlled by adjusting the amount of aqueous solvent medium used within the aforementioned limits.

However, when a causticized amylaceous material is employed as an additional extender, it is good procedure to prepare it in situ. To do this, it is desirable to add the resin components in a predetermined order. For convenience in describing this order of mixing, the components of an extended adhesive composition of the invention will have the designations set forth in the following schedule.

Designation:                                Component

W ——————— Finely divided, heat treated residue extender from the acid hydrolysis of pentosan-containing materials.

A ——————— Alkali metal hydroxide for digesting both the residue extender and the amylaceous material used.

E ——————— Amylaceous material reactive with alkali metal hydroxides.

C ——————— Catalyst for promoting the thermosetting reaction of the resin.

M ——————— Aqueous solvent medium.

R ——————— Soluble phenolic resin.

In mixing the aforementioned ingredients, the order in which they are brought together should be controlled within certain limits. The general mixing order is set forth below for those materials, as delimited by the brackets, for which the sequence of addition must be controlled. Within the brackets are materials for which the order of addition is immaterial. The mixing schedule proceeding from left to right is as follows:

$$[M,E,W]_1[M,A,W]_2[M,R,C]_3[M,R,W]_4$$

For example, the materials within the brackets $[M,A,W]_2$ are added to a mixture of the materials within the brackets $[M,E,W]_1$; the materials within the brackets $[M,R,C]_3$ are added to the resulting mixture of the materials within the brackets $[M,E,W]_1$ and $[M,A,W]_2$; etc.

In any one bracketed group of materials, the components therein can be added to the formulation simultaneously or in any order. Though mixing with the addition of each of the components is preferred, it is not necessary. When, in the foregoing schedule, a component appears in more than one bracketed group of materials, the total amount thereof to be added can be apportioned, as desired, among the indicated points of addition so as to provide the resulting mixture with a convenient consistency for mixing. This is particularly true of the aqueous solvent medium (M). It is added to the formulation, as needed, to produce a consistency permitting easy mixing and effective application to a surface to be bonded.

The extended adhesive formulations prepared in accordance with the invention are particularly well adapted for the bonding of wood veneers in the manufacture of plywoods. Such adhesive formulations are spread on the wood plies in amounts ranging from about 18 to about 30 pounds of total solids per thousand square feet of double glue line. The assembly time may vary from about 5 to about 30 minutes or more and preferably from 10 to about 20 minutes. The press time for satisfactory results may be within the range from about 3 to about 10 minutes or more depending upon the temperature of the platens, the thickness and number of plies being bonded, the number of panels per opening and the like considerations, such as are apparent to those persons skilled in the art. After having been pressed and cured at the bonding or curing temperature for the glue formulation, the plywood is removed from the press and stacked for conditioning to a suitable residual moisture content.

EXAMPLES

In several embodiments of the invention, heat treated forms of solid residues remaining after the acid hydrolysis of oat hulls were prepared according to the following treatment schedule. The particular residues utilized were two commercial products obtained under the trade names "Furafil 100" and "Furafil M," which products are similar in composition but differ as to particle size distribution and moisture content. The former product is sufficiently finely divided to substantially pass through a 100 mesh screen and usually contains from 3 to 18 percent moisture. Furafil M, on the other hand, must be ground, preferably after heat treatment, to a smaller particle size for employment herein and its moisture content varies from 5 to as much as 32 percent. A typical analysis of these products on a moisture free basis is reported below.

Table 1

|  | Percent |
|---|---|
| 2% caustic soda extractable | 22 |
| Alcohol soluble | 21 |
| Acetone extractable | 20 |
| Ether extractable | 4 |
| Cellulose | 38 |
| Residue from saccharification (lignin and resins) | 42 |
| Ash | 3–5 |
| Carbon (ultimate analysis) | 52 |

Treatment schedule

Residue extenders: Heat treatment
- I ------ Furafil 100 extender was heated for an extended period at 100° C. while exposed to the atmosphere until its original weight was reduced by 4.6%.
- II ------ Furafil 100 extender was heated for an extended period at 100° C. while exposed to the atmosphere until its original weight was reduced by 3.8%.
- III ------ Heat treated extender II was exposed to the atmosphere at 25° C. until the moisture absorbed equaled 2.68% of its original weight.
- IV ------ Heat treated extender I was further heated at a temperature of 150° C. for 10 minutes while exposed to the atmosphere whereby a further weight reduction of 2.1% was achieved.
- V ------ Furafil M extender was heated at 100° C. for 7 hours and 45 minutes and then over a temperature range of from 160 to 170° C. for 15 minutes whereby its original weight was reduced by 10%.
- VI ------ Furafil M extender was heated over a temperature range of from 160 to 190° C. for 35 minutes whereby its original weight was reduced by 14.8%.

For the purpose of comparison to demonstrate that something more than mere reduction in free moisture is involved in producing extenders from the residues in accordance with the invention, a control extender was prepared according to the following procedure. The Furafil 100 extender employed above was heated at 50° C. under a reduced pressure of 25 millimeters of mercury for 3 hours whereby its original weight was reduced 3.4 percent. This weight loss is believed to represent most of the initially available free moisture in the composition. The extender dehydrated in this manner is hereinafter designated moisture control extender VII.

Specific phenolic resin adhesive formulations were prepared employing the above heat treated residue extenders. For control purposes, resin formulations were also prepared with the commercial Furafil extenders without heat treatment. The composition schedule, mixing times and the total amount of extension with the residue extenders are set forth in the following Table 2.

Table 2

| Glue mix components in order of addition to mix | Glue 1 [1] | | Glues 2,[2] 3,[3] 4 [4] and 5 [5] | | Glue 6 [6] | |
|---|---|---|---|---|---|---|
|  | Amount, grams | Mixing time, minutes | Amount, grams | Mixing time, minutes | Amount, grams | Mixing time, minutes |
| Water | 24.5 | -------- | 26.5 | -------- | 24 | -------- |
| Wheat flour [7] | 1 | 5 | 1 | 5 | 1 | 5 |
| 50% Aqueous caustic [8] | 2.2 | 4 | 2.2 | 4 | 2.2 | 4 |
| Residue extender | 14.9 | 10 | 14.9 | 10 | 14.9 | 10 |
| Na$_2$CO$_3$ | 0.9 | 5 | 0.9 | 5 | 0.9 | 5 |
| Commercial phenolic resin (aqueous solution with 42.5% resin solids) | 25 | 5 | 25 | 5 | 25 | 5 |
| Water | 9 15 | 5 | -------- | -------- | -------- | -------- |
| Total glue solids, percent | 33.4 | -------- | 40.5 | -------- | 42 | -------- |
| Resin solids, percent | 12.4 | -------- | 15.1 | -------- | 15.6 | -------- |

[1] Glue 1 (control) is extended 140% with commercial "Furafil 100."
[2] Glue 2 (control) is extended 140% with heat treated moisture control extender VII.
[3] Glue 3 is extended 140% with heat treated extender I.
[4] Glue 4 is extended 140% with heat treated extender II.
[5] Glue 5 is extended 140% with heat treated extender III.
[6] Glue 6 is extended 140% with heat treated extender IV.
[7] About 10% additional extension was provided with wheat flour.
[8] The total amount of caustic was added in at least 2 increments with intervening stirring. Approximately 0.75 gram of the caustic added was for the purpose of swelling the wheat flour. The remainder of the caustic was for the residue extender.
[9] This additional water was required to obtain a spreadable glue.

Three ply Douglas Fir heartwood panels 6 x 6" were constructed of 1/8" veneer conditioned to about 4 percent moisture content employing the above prepared glue formulations. After coating the veneers with the glue formulations and assembling the panels, the panels were given a closed assembly time of 5 minutes before being pressed. Pressing was conducted in a hydraulic press operated at a platen temperature of 135° C. and 200 p.s.i. for 3.5 minutes.

Four 1" x 3" specimens were taken from the center of each cured plywood panel. Two of these specimens were split with a knife along the glue lines while dry and the remaining two similarly split after being subjected to two cycles of boiling in water with intervening drying. The average percentage wood failure in the split glue lines was determined by visual observation. The particular glues employed, along with the spread rates and test results are given in the following Table 3.

Table 3

| Glue | Residue extender | Glue spread rate, lbs./ 1,000 ft.² of double glue line | | | Test results, percent wood failure | |
|---|---|---|---|---|---|---|
| | | Wet spread | Resin solids | Total solids | Dry | Boiled |
| 1 | Furafil 100 | 65 | 8.1 | 21.7 | 15 | 5 |
| 2 | Moisture control Extender VII. | 65 | 8.1 | 21.7 | 30 | 15 |
| 3 | I | 53.8 | 8.1 | 21.7 | 75 | 65 |
| 4 | II | 53.8 | 8.1 | 21.7 | 75 | 50 |
| 5 | III | 57 | 8.1 | 21.7 | 70 | 60 |
| 6 | IV | 52 | 8.1 | 21.7 | 75 | 75 |

In further operations similar to those outlined above, a phenolic resin based thermosetting glue extended to 140 percent with Furafil M extender, which had been ground to a particle size small enough to pass through an 80 mesh screen, was compared to identical glues containing in place of the Furafil M extender identical amounts of residue extenders V and VI described in the foregoing heat treatment schedule. These heat treated residue extenders had also been reduced to a particle size small enough to pass through an 80 mesh screen. Plywood panels manufactured with the glue containing the natural Furafil M extender having 8.2 pounds of resin solids per 1,000 square feet of double glue line gave 40 percent dry wood failure and 20 percent wood failure after boiling for 4 hours in water. Panels made with glues containing the heat treated residue extenders V and VI gave at least 75 percent dry wood failure and 75 percent wood failure after boiling for 4 hours.

In a manner similar to that of the foregoing, heat treated residues from the acid hydrolysis of pentosan-containing materials, such as extenders I, II, III, IV, V and VI of the aforedescribed heat treatment schedule, are employed in amounts ranging from 0.25 to 1.6 parts thereof per part of resin solids in phenolformaldehyde adhesive formulations for the manufacture of exterior grade plywood. With extensions of 1.6 to 2.5 parts of the heat treated residue per part of phenolic resin solids, the resulting glues can be used to prepare good interior grade plywoods. If desired, superior formulations are obtained substantially in accordance to the foregoing described compositions except that the additional extension with the wheat flour and caustic necessary to swell the same are omitted from the formulation.

What is claimed is:
1. A liquid glue composition comprising:
    (a) 1 part by weight of a soluble, thermosetting phenol-aldehyde resin;
    (b) from about 0.25 up to about 2.5 parts by weight of a specially conditioned, finely divided residue from the acid hydrolysis of pentosan-containing materials, said residue being specially conditioned by:
        (1) having been heated at a temperature within the range from about 80° to about 200° C. until the residue achieved a weight loss of at least 3 but no more than 20 percent of its original weight, and
        (2) digestion with from about 1.5 to 15 percent by weight of an alkali metal hydroxide based on the weight of the heated residue;
    (c) a catalytic amount of a base catalyst suitable for initiating the thermosetting reaction of the phenolic resin; and
    (d) sufficient water such that the total solids of the liquid adhesive composition is within the range from about 35 to about 65 percent by weight of the total composition.

2. A liquid glue composition of claim 1 and containing in addition from about 0.01 to about 0.5 part by weight of an amylaceous material along with sufficient additional alkali metal hydroxide to swell the amylaceous material.

3. A liquid glue composition as in claim 2 wherein the amylaceous material is wheat flour.

4. A liquid glue composition as in claim 1 wherein the resin is a water-soluble, thermosetting phenolic resin obtained by partially condensing in the presence of a basic catalyst from about 0.8 to about 3 moles of formaldehyde per mole of phenol.

5. A liquid glue composition as in claim 1 wherein the resin is a water-soluble, thermosetting resin obtained by partially condensing in the presence of a basic catalyst from about 0.8 to about 3 moles of formaldehyde per mole of phenol, said liquid adhesive composition containing in addition from about 0.01 to about 0.5 part by weight of an amylaceous material along with sufficient additional alkali metal hydroxide to swell the amylaceous material.

6. A liquid glue composition as in claim 5 wherein the basic catalyst is an alkali metal carbonate.

7. A liquid glue composition as in claim 1 wherein the amount of the specially conditioned, finely divided residue from the acid hydrolysis of pentosan-containing materials is within the range from about 1 to 1.6 parts by weight per part of resin solids.

8. A method for the production of a highly extended liquid phenolic resin glue formulation which comprises mixing together in any order:
    (1) 1 part by weight of a soluble, thermosetting phenol-aldehyde resin,
    (2) from about 0.25 up to about 2.5 parts by weight of a finely divided residue from the acid hydrolysis of pentosan-containing materials, said residue being characterized by having been heated at a temperature within the range from about 80° to about 200° C. until the residue achieved a weight loss of at least 3 percent, but no more than 20 percent of its original weight,
    (3) a catalyst amount of a basic catalyst suitable for initiating the thermosetting reaction of the resin,
    (4) from about 1.5 to about 15 percent by weight of an alkali metal hydroxide based on the weight of the heated finely divided residue,
    (5) sufficient aqueous dispersing medium such that the total solids of the liquid adhesive composition is within the range from at least 35 to 65 percent by weight of the total glue composition, hereinafter designated M.

9. A method for the production of a highly extended liquid phenolic resin glue formulation which comprises mixing together:
    (1) one part by weight of a soluble, thermosetting phenol-aldehyde resin, hereinafter designated R,
    (2) from about 0.25 up to about 2.5 parts by weight of a finely divided residue from the acid hydrolysis of pentosan-containing materials, said residue being characterized by having been heated at a temperature within the range from about 80° to about 200° C.

until the residue undergoes a weight loss of at least 3 percent, but no more than 20 percent of its original weight, hereinafter designated W, (3) a catalytic amount of a basic catalyst suitable for initiating the thermosetting reaction of the phenolic resin, hereinafter designated C, (4) from about 0.01 to 0.5 part of an amylaceous material, hereinafter designated E, (5) sufficient alkali metal hydroxide for digesting both the heated, finely divided residue (W) and the amylaceous material (E), hereinafter designated A, and (6) sufficient aqueous dispersing medium such that the total solids of the liquid adhesive composition is within the range from at least 35 to 65 percent by weight of the total glue composition, hereinafter designated M, said mixing being conducted according to the mixing schedule proceeding from left to right as follows:

$$[M,E,W]_1[M,A,W]_2[M,R,C]_3[M,R,W]_4$$

wherein groups of material within the brackets can be mixed together in any order and the groups of materials, as delimited by the brackets, are mixed together in the sequence designated by the subscripts, with intervening mixing sufficient to produce a uniform composition; the total amount of any component added being within the above prescribed proportions.

10. A method as in claim 9 wherein the amylaceous material is wheat flour.

11. A method as in claim 9 wherein the resin is a water-soluble, thermosetting phenolic resin obtained by partially condensing in the presence of a basic catalyst from about 0.8 to about 3 moles of formaldehyde per mole of phenol.

12. A method as in claim 9 wherein the basic catalyst is an alkali metal carbonate.

13. A method as in claim 9 wherein the amount of the heated, finely divided residue from the acid hydrolysis of pentosan-containing materials used is within the range from about 1 to 1.6 parts by weight per part of resin solids.

14. A method for improving solid residues obtained from the acid hydrolysis of pentosan-containing materials for employment in phenolic resin glue formulations as extenders which comprises heating the solid residue in a granulated form at a temperature within the range from about 80° to about 200° C. until the residue undergoes a weight loss of at least 3 but no more than 20 percent of its original weight.

References Cited by the Examiner
UNITED STATES PATENTS

| | | | |
|---|---|---|---|
| 2,290,833 | 7/1942 | Keyser et al. | 161—237 |
| 2,380,214 | 7/1945 | Burrell | 260—17.2 |
| 2,727,869 | 12/1955 | Ash et al. | 260—17.2 |
| 2,781,328 | 2/1957 | Ayers et al. | 260—17.2 |

WILLIAM H. SHORT, *Primary Examiner.*

E. M. WOODBERRY, *Assistant Examiner.*